United States Patent [19]

Kishi

[11] Patent Number: 4,471,742
[45] Date of Patent: Sep. 18, 1984

[54] FUEL SUPPLY CONTROL METHOD FOR AN INTERNAL COMBUSTION ENGINE EQUIPPED WITH A SUPERCHARGER

[75] Inventor: Noriyuki Kishi, Itabashi, Japan

[73] Assignee: Honda Giken Kogyo Kabushiki Kaisha, Tokyo, Japan

[21] Appl. No.: 498,947

[22] Filed: May 27, 1983

[30] Foreign Application Priority Data

May 28, 1982 [JP] Japan .................................. 57-90658

[51] Int. Cl.$^3$ ............................................. F02M 31/00
[52] U.S. Cl. .................................... 123/478; 123/480; 123/479; 123/399; 123/528
[58] Field of Search ............... 123/478, 479, 480, 399, 123/438, 487, 492, 493, 528, 559

[56] References Cited

U.S. PATENT DOCUMENTS 4,418,673  12/1983  Tominaro et al. .................. 123/478
4,424,785  1/1984   Ishida et al. ........................ 123/478
4,430,976  2/1984   Kondo et al. ....................... 123/480

FOREIGN PATENT DOCUMENTS 53-141831  12/1978  Japan .................................. 123/478

Primary Examiner—Raymond A. Nelli
Attorney, Agent, or Firm—Lyon & Lyon

[57] ABSTRACT

A fuel supply control method for electronically controlling the fuel supply to an internal combustion engine equipped with a supercharger. Pressure in the intake passage downstream of a throttle valve arranged therein is detected by first and second pressure sensor means, whereas a plurality of predetermined values of basic fuel quantity are stored in each of first and second storage means corresponding, respectively, to the first and second pressure sensor means, which are functions of the intake passage pressure and the engine rpm. When the value of an output signal from one of the first and second pressure sensor means is smaller than a predetermined value, a stored value of basic fuel quantity corresponding to the value of an output signal from the first pressure sensor means and the engine rpm is read from the first storage means, and when the value of the output signal from the above one pressure sensor means is larger than the above predetermined value, a stored value of basic fuel quantity corresponding to the value of an output signal from the second pressure sensor means is read from the second storage means. A quantity of fuel corresponding to the stored value thus read is supplied to the engine.

7 Claims, 8 Drawing Figures

FIG.7

| Ne \ PBTC | PBA18 | .... | PBAk | .... | PBA25 |
|---|---|---|---|---|---|
| N1 | TM1,18 | | | | |
| ⋮ | | | | | |
| Ni | | | TMik | | |
| ⋮ | | | | | |
| N16 | | | | | TM16,25 |

FIG.8

| Ne \ PBNA | PBA1 | .... | PBAj | .... | PBA17 |
|---|---|---|---|---|---|
| N1 | TM11 | | | | |
| ⋮ | | | | | |
| Ni | | | TMij | | |
| ⋮ | | | | | |
| N16 | | | | | TM16,17 |

FUEL SUPPLY CONTROL METHOD FOR AN INTERNAL COMBUSTION ENGINE EQUIPPED WITH A SUPERCHARGER

BACKGROUND OF THE INVENTION

This invention relates to a fuel supply control method for internal combustion engines equipped with superchargers, and more particularly to a fuel supply control method of this kind, which is capable of improving the accuracy of control of the fuel quantity to be supplied to such a supercharged engine in which the intake pipe pressure varies over a wide range during operation of the engine due to the supercharging effect.

A fuel supply control system adapted for use with an internal combustion engine, particularly a gasoline engine has been proposed e.g. by U.S. Pat. No. 3,483,851, which is adapted to determine the valve opening period of a fuel quantity metering or adjusting means for control of the fuel injection quantity, i.e. the air/fuel ratio of an air/fuel mixture being supplied to the engine, by first determining a basic value of the above valve opening period as a function of at least the intake pipe absolute pressure and then adding to and/or multiplying same by constants and/or coefficients being functions of engine rpm, intake air temperature, engine cooling water temperature, throttle valve opening, exhaust gas ingredient concentration (oxygen concentration), atmospheric pressure, etc., by electronic computing means.

If such proposed fuel supply control method is applied to an internal combustion engine equipped with a supercharger, in which usually the intake pipe pressure can vary over a wider range than in an internal combustion engine without a supercharger, high detecting accuracy may not be achieved with a single pressure sensor for detecting the intake pipe pressure, to make it impossible to perform accurate control of the fuel quantity being supplied to the engine, thereby badly affecting the driveability, emission characteristics and fuel consumption of the engine.

The term "supercharger", as used through the present specification is defined as a term including not only a turbocharger which is driven by a flow of engine exhaust gases, from an engine, and a supercharger having a compressor coupled to the crankshaft or a camshaft of an engine to be directly driven thereby, but also a type which is driven together with a cooling fan by the crankshaft of an engine via a fan belt and a type which is driven by an electric motor.

A similar disadvantage to that mentioned above, attributable to the use of a single pressure sensor for detecting the intake pipe pressure, is also possessed by an internal combustion engine equipped with a supercharger, of the type that each engine cylinder has a main combustion chamber and a sub combustion chamber communicating therewith, in which also the intake pipe pressure largely varies due to the supercharging effect. Further, it has been experimentally ascertained that when the engine is operating at a high supercharging rate, if the air/fuel ratio of the mixture being supplied to the sub combustion chamber is set to the rich side, there can occur overheating of tip of the ignition plug, etc. to cause premature ignition, heavily deteriorating the driveabilty of the engine.

SUMMARY OF THE INVENTION

It is a first object of the invention to provide a fuel supply control method for an internal combustion engine equipped with a supercharger, which is capable of detecting with high accuracy the intake pipe pressure which is variable over a wide range during supercharged operation of the engine, so as to control the fuel quantity being supplied to the engine with high accuracy over the entire intake pipe pressure region of the engine, thereby to achieve optimum driveability, emission characteristics, fuel consumption of the engine.

According to the invention, there is provided a fuel supply control method for electronically controlling the quantity of fuel being supplied to an internal combustion engine having a supercharger, comprising the following steps: (1) detecting pressure in an intake passage of the engine at a location downstream of a throttle valve arranged therein, by means of first and second pressure sensor means; (2) storing a plurality of predetermined values of basic fuel quantity which are functions of the intake passage pressure and the engine rpm, in each of first and second storage means which correspond, respectively, to the above first and second pressure sensor means; (3) comparing the value of an output signal from one of the first and second pressure sensor means with a predetermined value; (4) reading from the first storage means a stored value of basic fuel quantity corresponding to the value of an output signal from the first pressure sensor means and the engine rpm, when it is determined in the step (3) that the value of the output signal from the above one pressure sensor means is smaller than the predetermined value; and (5) reading from the second storage means a stored value of basic fuel quantity corresponding to the value of an output signal from the second pressure sensor means and the engine rpm, when it is determined in the step (3) that the value of the output signal from the above one pressure sensor means is larger than the above predetermined value; (6) and supplying a quantity of fuel corresponding to the stored value read in the step (4) or (5) to the engine.

Preferably, the predetermined values of basic fuel quantity stored in the first storage means are set at such values that the resultant air/fuel ratio of an air/fuel mixture supplied to the engine has a required value appropriate to a normal operating condition of the engine in a predetermined low rate supercharged operating region, whereas the predetermined values of basic fuel quantity stored in the second storage means are set at such values that the resulting air/fuel ratio of the mixture supplied to the engine has a value smaller than the above-mentioned required value.

It is a second object of the invention to provide a fuel supply control method adapted for application to an internal combustion engine having a supercharger, and a main combustion chamber provided in each engine cylinder and a sub combustion chamber communicating therewith, and which is capable of detecting with high accuracy the intake pipe pressure which can vary over a wide range due to the supercharging effect, so as to control with high accuracy the quantities of fuel being supplied to the main combustion chamber and the sub combustion chamber over the entire intake pipe pressure region of the engine, to thereby improve the emission characteristics, fuel consumption, etc. of the engine, and when the engine is in a high rate supercharged operating condition, the method is adapted to supply appropriate quantities of fuel to the main combustion chamber as well as to the sub combustion chamber, to thereby prevent abnormal combustion in the engine cylinder such as premature ignition, and therefore improve the driveability of the engine.

According to a second aspect of the invention, there is provided a fuel supply control method for electronically controlling the quantity of fuel being supplied to an internal combustion engine having a supercharger, and a main combustion chamber provided in each cylinder, and a sub combustion chamber communicating therewith, which comprises the following steps: (1) detecting pressure in an intake pressure of the engine at a location downstream of a throttle valve arranged therein, by means of first and second pressure sensor means; (2) storing in each of first and second storage means two different sets of a plurality of predetermined values of basic fuel quantity being supplied, respectively, to the main combustion chamber and the sub combustion chamber, and which are functions of the intake passage pressure and the engine rpm; (3) comparing the value of an output signal from one of the first and second pressure sensor means with a predetermined value; (4) reading from the first storage means a stored value of basic fuel quantity in one of the two different sets, corresponding to the value of an output signal from the first pressure sensor means and the engine rpm and being supplied to the main combustion chamber, and also a stored value of basic fuel quantity in the other set, corresponding to the value of the output signal from the first pressure sensor means and the engine rpm and being supplied to the sub combustion chamber, when it is determined in the step (3) that the value of the output signal from the above one pressure sensor means is smaller than the aforementioned predetermined value; (5) reading from the second storage means a stored value of basic fuel quantity in one of the above two different sets, corresponding to the value of an output signal from the second pressure sensor means and the engine rpm and being supplied to the main combustion chamber, and also a stored value of basic fuel quantity in the other set, corresponding to the value of the output signal from the second pressure sensor means and the engine rpm and being supplied to the sub combustion chamber, when it is determined in the step (3) that the value of the output signal from the above one pressure sensor means is larger than the aforementioned predetermined value; and (6) supplying quantities of fuel corresponding to respective ones of the stored values read in the step (4) or (5) to the main combustion chamber and the sub combustion chamber. Preferably, the stored value of basic fuel quantity stored in the second storage means and being supplied to the sub combustion chamber of the engine is set at a predetermined value inclusive of zero.

The above and other objects, features and advantages of the invention will be more apparent from the ensuing detailed description taken in conjunction with the accompanying drawings.

BRIEF DESCRIPTION OF THE DRAWINGS

FIG. 7 is a view showing a map of values TiM applicable during high rate supercharged operation of the engine; and FIG. 8 is a view showing a map of TiM applicable during low rate supercharged operation of the engine.

DETAILED DESCRIPTION

The invention will now be described in detail with reference to the drawings.

Figure 1:
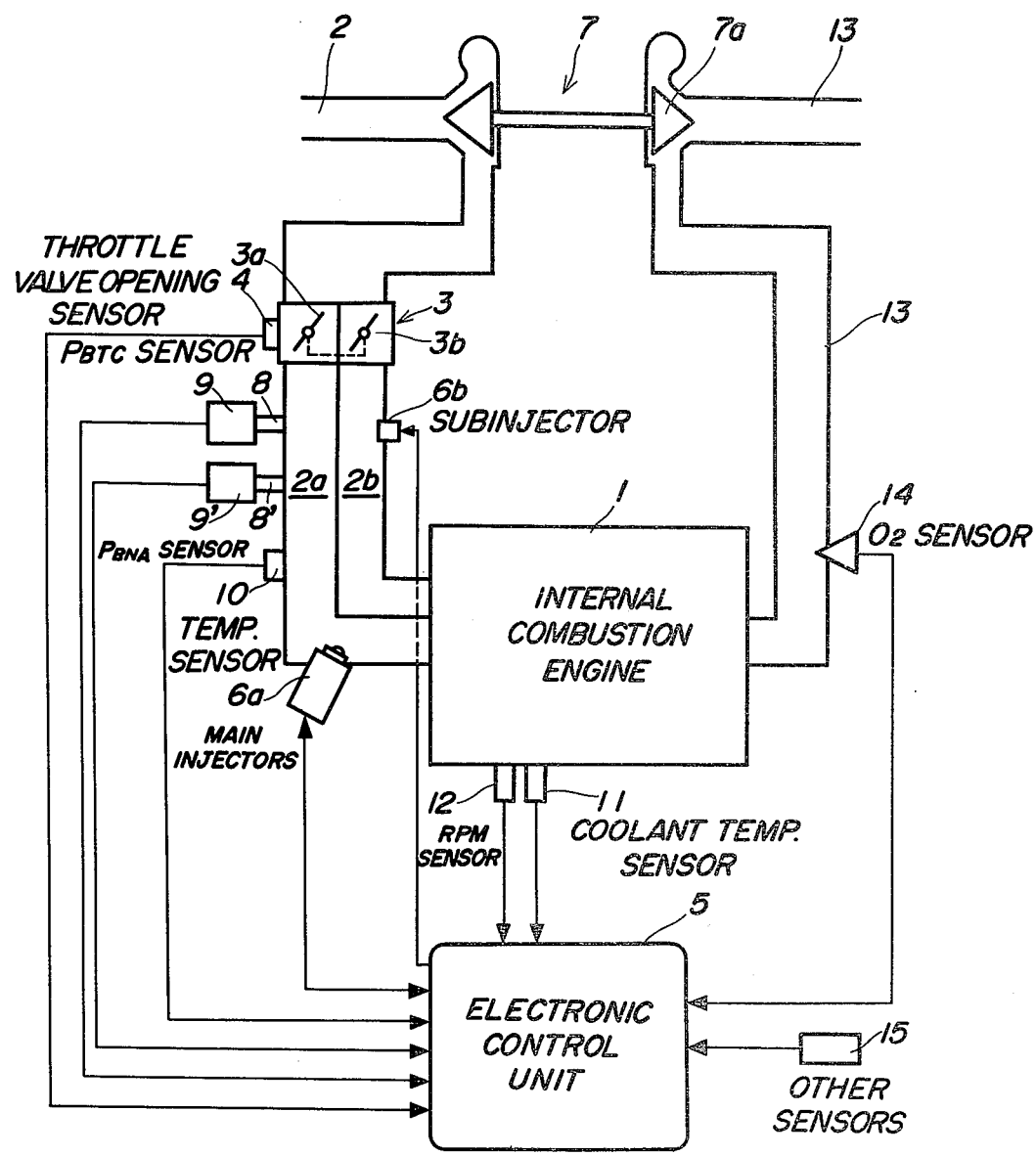
FIG. 1 is a block diagram illustrating the whole arrangement of a fuel supply control system to which is applicable the method according to the invention.
Figure 2:
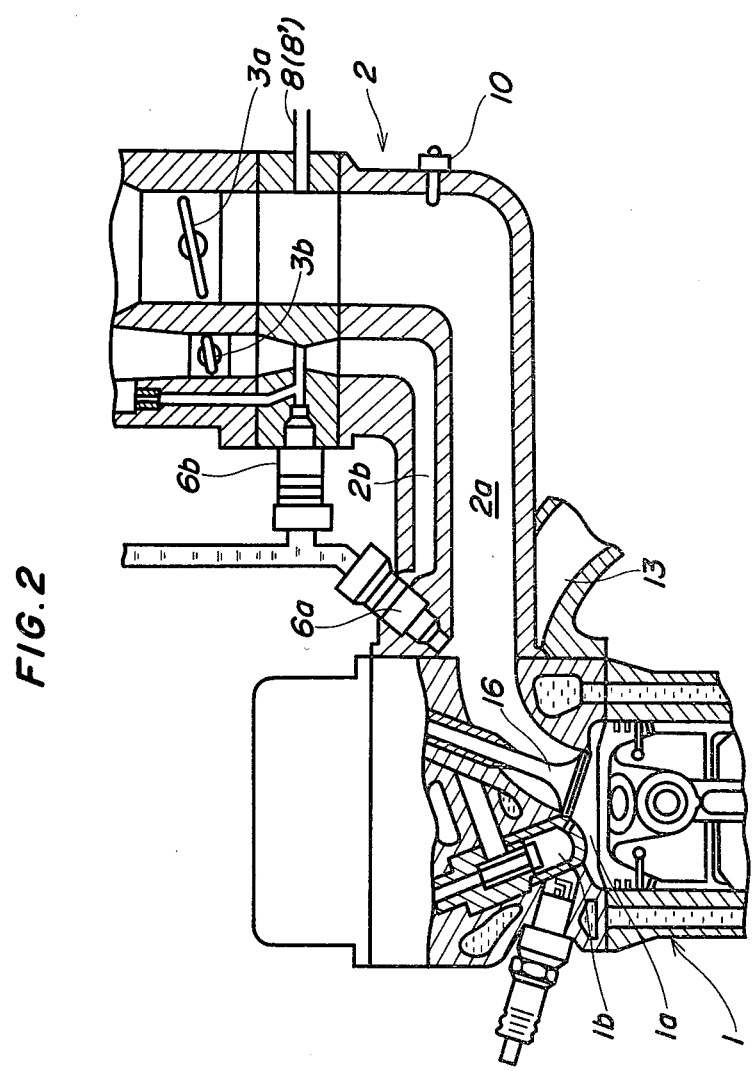
FIG. 2 is a view illustrating details of the engine in FIG. 1 and its peripheral parts.

FIG. 1 illustrates the whole arrangement of a fuel injection control system for internal combustion engines, to which the method of the present invention is applicable, and FIG. 2 illustrates details of the engine in FIG. 1 and its peripheral parts. Reference numeral 1 designates an internal combustion engine which may be a four-cylinder type, for instance. This engine 1 has main combustion chambers 1a which may be four in number and each formed within each of the engine cylinders and sub combustion chambers 1b communicating with the respective main combustion chambers 1a. An intake pipe 2 is connected to the engine 1, which comprises a main intake pipe 2a communicating with each main combustion chamber 1a, and a sub intake pipe 2b with each sub combustion chamber 1b, respectively. Arranged across the intake pipe 2 is a throttle body 3 which accommodates a main throttle valve 3a and a sub throttle valve 3b mounted in the main intake pipe and the sub intake pipe, respectively, for synchronous operation. A throttle valve opening sensor 4 is connected to the main throttle valve 3a for detecting its valve opening and converting same into an electrical signal which is supplied to an electronic control unit (hereinafter called "ECU") 5.

Inserted, respectively, into the main intake pipe 2a and the sub intake pipe 2b are main injectors 6a and a subinjector 6b. The main injectors 6a correspond in number to the engine cylinders and are each arranged in the main intake pipe 2a at a location slightly upstream of an intake valve 16 of a corresponding engine cylinder, while the subinjector 6b, which is single in number, is arranged in the sub intake pipe 2b at a location slightly downstream of the sub throttle valve 3b, for supplying fuel to all the engine cylinders. The main injectors 6a and the subinjector 6b are mechanically connected to a fuel pump, not shown, and electrically connected to the ECU 5 in a manner having their valve opening periods or fuel injection quantities controlled by signals supplied from the ECU 5.

A turbocharger 7 has a turbine 7a arranged inside the exhaust pipe 13 of the engine 1 so as to drive the compressor 7b of the turbocharger 7, arranged in the intake pipe 2 at a location upstream of the throttle valve 3, in response to a flow of exhaust gases emitted from the engine.

An absolute pressure (PBTC) sensor 9 and another absolute pressure (PBNA) sensor 9' are arranged at locations immediately downstream of the throttle valve 3, which communicate with the intake pipe 2, respectivley, through conduits 8 and 8', and are electrically connected to the ECU 5.

As described in detail later, when the intake pipe absolute pressure is higher than a predetermined value PBAMAX, the output signal from the absolute pressure (PBTC) sensor 9 is used as a control parameter signal, while when the intake pipe absolute pressure is lower than the above predetermined value PBAMAX, the output signal from the other absolute pressure (PBNA) sensor 9' is used as such control parameter signal. These sensors 9, 9' supply respective electrical signals indicative of detected absolute pressures to the ECU 5.

Also, an intake air temperature sensor 10 is arranged in the intake pipe 2, which supplies a signal indicative of detected intake air temperature to the ECU 5. An engine cooling water temperature sensor 11, which may be formed of a thermistor or the like, is mounted on the body of the engine in a manner embedded in the peripheral wall of an engine cylinder having its interior filled with engine cooling water, and an electrical output signal of which is supplied to the ECU 5. An engine rpm sensor (hereinafter called "Ne sensor") 12 is arranged on a camshaft or a crankshaft of the engine, neither of which is shown, which sensor generates one pulse at a particular predetermined crank angle of the engine and supplies such pulses to the ECU 5. An $O_2$ sensor 14 is inserted in the exhaust pipe 13 of the engine at a location between the aforementioned turbine 7a of the turbocharger 7 and the engine 1 for detecting oxygen concentration in the exhaust gases from the engine and supplying a signal indicative of detected oxygen concentration to the ECU 5. Further, there are provided other engine operation parameter sensors 15 for detecting, e.g. atmospheric pressure, back pressure, etc. detected values of which are supplied to the ECU 5 as other engine operation parameter signals.

The ECU 5 operates on the various engine operation parameter signals as stated above, inputted thereto to determine the valve opening periods TOUTM and TOUTS for the main injectors 6a and the subinjector 6b, by the use of the following equations:

$$TOUTM = TiM \times K_1 + TK_2 \quad (1)$$

$$TOUTS = TiS \times K'_1 + TK'_2 \quad (2)$$

where TiM and TiS represent the basic fuel injection periods of the main injectors 6a and the subinjector 6b, each of which is read from a corresponding storage means within the ECU 5, as a function of the intake pipe absolute pressure and the engine rpm, as hereinafter described, $K_1$, $K'_1$ and $TK_2$, $TK'_2$ correction coefficients. These correction coefficients $K_1$, $K'_1$ and $TK_2$, $TK'_2$ are calcuated on the basis of engine operation parameter signals from the various sensors, that is, the intake pipe absolute pressure sensors 9, 9', the intake air temperature sensor 10, the engine cooling water temperature sensor 11, the Ne sensor 12, the throttle valve opening sensor 4, the $O_2$ sensor 14, and the other engine operation parameter sensors 15, by the use of respective predetermined equations so as to achieve optimum startability, emission characteristics, fuel consumption, accelerability, etc. of the engine in accordance with the operating conditions of the engine.

The ECU 5 operates on the values of the fuel injection periods TOUTM, TOUTS calculated as above to supply driving signals to the main injectors 6a and the subinjector 6b to open same with duty factors corresponding to the same signals.

Figure 3:
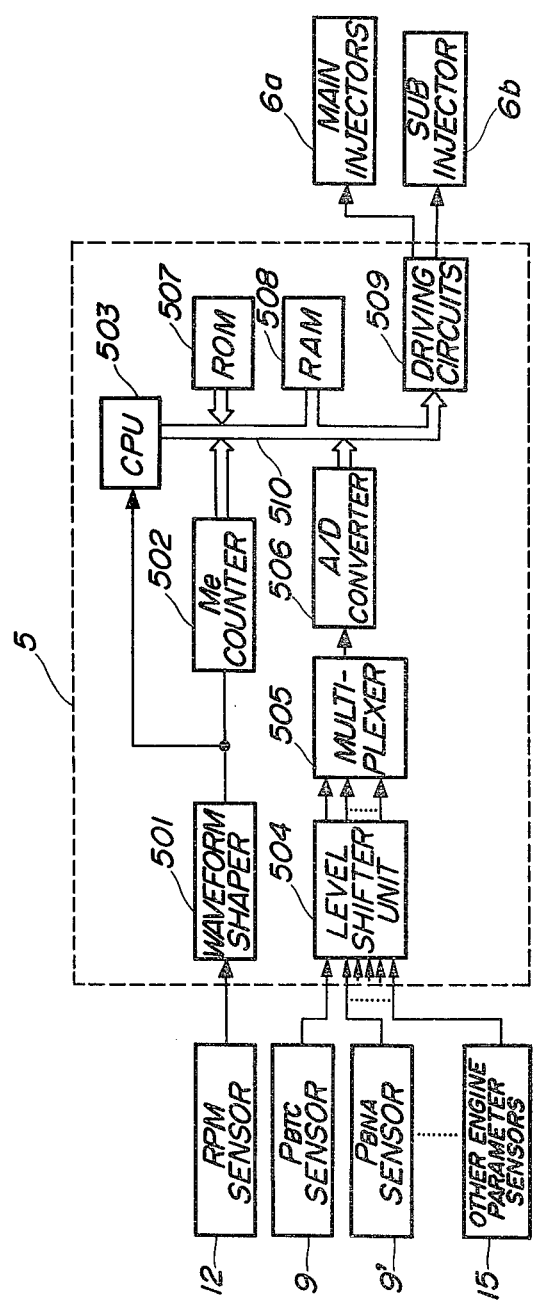
FIG. 3 is a circuit diagram showing an electrical circuit within the electronic control unit (ECU) in FIG. 1.

FIG. 3 shows an electrical circuit within the ECU 5 in FIG. 1. The engine rpm signal from the Ne sensor 12 in FIG. 1 is applied to a waveform shaper 501, wherein it has its waveform shaped, and supplied to a central processing unit (hereinafter called "CPU") 503 as a TDC signal as well as to an Me value counter 502. The Me value counter 502 counts the interval of time between a preceding pulse of the engine rpm signal generated at a predetermined crank angle of the engine and a present pulse of the same signal generated at the predetermined crank angle, inputted thereto from the Ne sensor 12, and therefore its counted value Me corresponds to the reciprocal of the actual engine rpm Ne. The Me value counter 502 supplies the counted value Me to the CPU 503 via a data bus 510.

The respective output signals from the absolute pressure PBTC sensor 9, the absolute pressure PBNA sensor 9', the intake air temperature sensor 10, the engine cooling water temperature sensor 11, the $O_2$ sensor, and the other engine operation parameter sensors 15, all appearing in FIG. 1, have their voltage levels shifted to a predetermined voltage level by a level shifter unit 504 and applied to an analog-to-digital converter 506 through a multiplexer 505. The A/D converter 506 successively converts the above signals into digital signals and supplies them to the CPU 503 via the data bus 510.

The CPU 503 is also connected to a read-only memory (hereinafter called "ROM") 507, a radom access memory (hereinafter called "RAM") 508, and driving circuits 509, through the data bus 510. The RAM 508 temporarily stores the resultant values of various calculations from the CPU 503, while the ROM 507 stores a control program executed within the CPU 503, maps of basic fuel injection periods for the main injectors 6a and the subinjector 6b, hereinafter referred to. The CPU 503 executes the control program stored in the ROM 507 to calculate the valve opening periods TOUTM, TOUTS for the main injectors 6a and the subinjector 6b in response to the various engine operation parameter signals referred to previously, and supplies the calculated TOUTM and TOUTS values to the driving circuit 509 via the data bus 510. The driving circuits 509 supply driving signals corresponding to the above TOUTM and TOUTS values to the main injectors 6a and the subinjector 6b to open same.

Now, explanation will be made of the manner of calculating the fuel injection periods TOUTM and TOUTS for the main injectors 6a and the subinjector 6b in response to the intake pipe absolute pressure, with reference to FIGS. 4 through 8.

Figure 4:
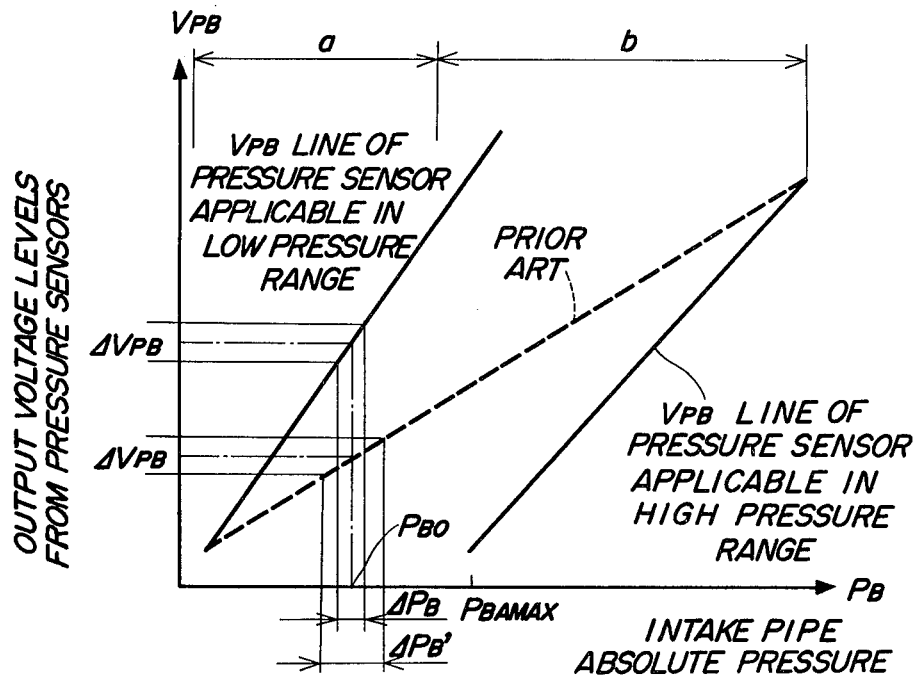
FIG. 4 is a graph showing the relationship between the intake pipe pressure PB and the output voltage levels from pressure sensors for detecting the same pressure.
Figure 5:
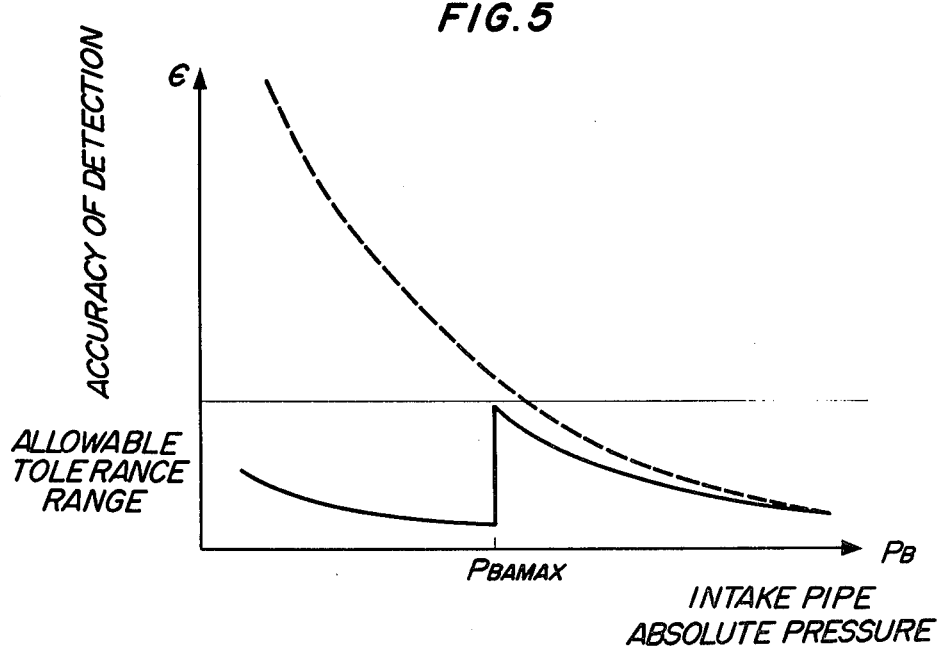
FIG. 5 is a graph showing the relationship between the intake pipe pressure PB and the accuracy of detection of the pressure sensors.

Referring first to FIGS. 4 and 5, there are shown, respectively, graphs of the relationship between the intake pipe absolute pressure PB and the output voltage levels from the pressure sensors for detecting the same pressure, and that between the same pressure and the accuracy of detection of the sensors. In FIG. 4, the pressure range indicated by the symbol a is a pressure range which can usually be assumed by a normal internal combustion engine without a supercharger, whereas the pressure range that can be assumed by an internal combustion engine equipped with a supercharger can extend through the range indicated by the symbol b in addition to the pressure range a. In FIG. 4, the broken line indicates a change in the pressure sensor output voltage level with respect to the intake pipe pressure, which can take place in the case where a single pressure sensor is used to detect the both pressure ranges a, b, as in a normal internal combustion engine without a supercharger. FIG. 5 shows the accuracy of detection of the pressure sensor with respect to the intake pipe pressure. The degree of accuracy of detection $\epsilon$ is defined as follows:

$$\epsilon = \Delta PB / PB0$$

where PB0 represents a detected value of the intake pipe absolute pressure, and $\Delta PB$ the error between an actual value of the intake pipe pressure and the detected value.

It will be learned from the above equation that the smaller the detecting error $\Delta PB$, or the larger the detected value PB0, the degree of accuracy of detection $\epsilon$ becomes smaller, that is, the detection accuracy become higher. In FIG. 5, the broken line indicates a change in the degree of accuracy of detection with respect to the detected value PB0, on the assumption that the detecting error $\Delta PB$ remains constant. The detection error $\Delta PB$ mainly depends upon the error of reading $\Delta VPB$ of the pressure sensor output voltage value VPB. Particularly in the case where the output voltage VPB is converted into a digital value by an analog-to-digital converter, the reading error $\Delta VPB$ is determined by a minimum value that the digital output value from the analog-to-digital converter can assume, that is, the resolution of the same converter.

In view of this, the larger the rate of change of the output voltage value VPB of the pressure sensor with respect to the intake pipe pressure PB, the smaller the detecting error $\Delta PB$ can become, provided that the reading error $\Delta VPB$ remains constant. In order to satisfy such required detecting accuracy, according to the invention, two pressure sensors 9, 9' are provided for detection of the intake pipe pressure so that in the low intake pipe pressure range a the rate of change of the output voltage value VPB is larger so as to minimize the detecting error $\Delta PB$, thereby always keeping the accuracy of detection of the intake pipe pressure within an allowable tolerance range.

Figure 6:
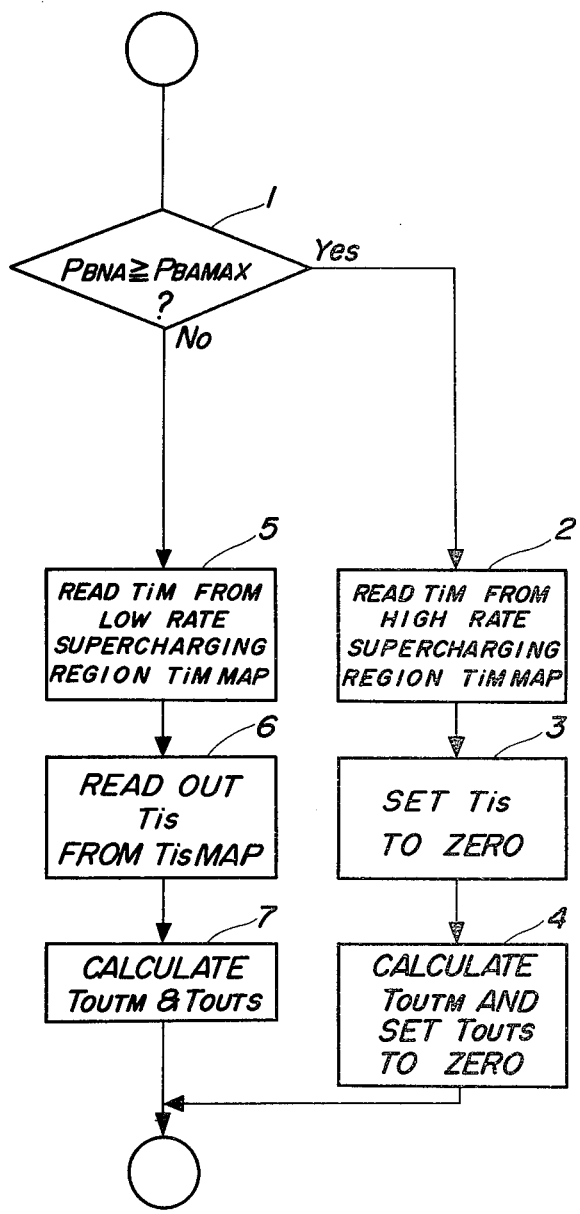
FIG. 6 is a flow chart of a program for calculating the valve opening periods of the injectors.

FIG. 6 shows a flow chart of a method for calculating the fuel injection periods TOUTM and TOUTS for the main injectors 6a and the subinjector 6b in response to the value of the intake pipe absolute pressure, which is executed by the CPU 503 in FIG. 3. First, it is determined at the step 1 whether or not a sensor output signal indicative of the intake pipe absolute pressure is larger than a first predetermined value PBAMAX, for instance, 1160 mmHg. This output signal may be from either of the two absolute pressure sensors 9, 9', for instance, an output signal PBNA from the absolute pressure (PBNA) sensor 9' which is adapted to detect the intake pipe absolute pressure in a lower range. If the answer to the question of the step 1 is yes, the CPU 503 operates on the value of the output signal PBTC from the higher range pressure (PBTC) sensor 9 and the value of the engine rpm signal Ne from the Ne sensor 12 to read a corresponding value of basic fuel injection period TiM for the main injectors 6a from a high rate supercharging region TiM map stored within the ROM 507 (step 2). FIG. 7 shows the above high rate supercharging region TiM map. In the same map, there are provided eight predetermined values PBA18–PBA25 of intake pipe absolute pressure PBTC ranging e.g. from 1130 mmHg to 1760 mmHg, whereas are also provided sixteen predetermined values N1–N16 of engine rpm Ne ranging e.g. from 400 rpm to 6000 rpm. If either one of detected values of the engine rpm Ne and the intake pipe absolute pressure PBTC falls between adjacent ones of the predetermined values Ni or PBAi, the value of the basic fuel injection period TiM is calculated by an interpolation method. The values of fuel injection period TiM for the main injectors 6a, stored in this high rate supercharging region TiM map are set at such values that the resultant air/fuel ratio is richer than an air/fuel ratio (e.g. a theoretical air/fuel ratio) resulting from the values of the basic fuel injection period TiM determined from a low rate supercharging region TiM map, referred to later, which is applied during low rate supercharged operation, i.e. normal running operation of the engine. That is, by thus setting the air/fuel ratio to a richer value, that is, by increasing the quantity of fuel being supplied to the engine while the engine is operating in the high rate supercharging region, not only higher output of the engine can be obtained but also locally overheated portions of the engine cylinders can be sufficiently cooled by the fuel contained in the mixture to thereby prevent abnormal combustion in the engine cylinders, such as premature ignition.

Simultaneously with the execution of the step 2, the CPU 503 sets the value of the basic fuel injection period TiS for the subinjector 6b to zero, at the step 3 in FIG. 6. This is because if fuel is supplied to the sub combustion chamber during the high rate supercharged operation, there can occur overheating of tip of the ignition plug to cause premature ignition, as contrary to the case with the main combustion chamber which, as previously noted, is supplied with a mixture richer during such high rate supercharged operation than during normal or low rate supercharged operation. It is presumed that the reason for the above phenomenon of premature ignition in the sub combustion chamber lies in that the supply of fuel would impart heat to certain local portions of the sub combustion chamber for accumulation of heat there, rather than cool them.

Then, the program proceeds to the step 4, wherein the fuel injection period TOUTM for the main injectors 6a is calculated by correcting the value of the basic fuel injection period TiM calculated as above through multiplication and addition, respectively, by the correction coefficient $K_1$ and the correction value $TK_2$ the values of which are calculated in response to the values of the various engine operation parameter signals, by the use of the aforementioned equation (1), and at the same time the value of the basic fuel injection period TOUTS for the subinjector 6b is set to zero.

If there is a possibility of coking, that is, the phenomenon that tar which has been produced by thermal decomposition of fuel adheres to a passage wall in the subinjector 6b to clog the passage, when the fuel supply to the sub combustion chamber is interrupted during the high rate supercharged operation of the engine, fuel may be supplied to the engine during the same operation of the engine in such a small amount that the above premature ignition will not take place. To this end, during the high rate supercharged operation of the engine, the value of the fuel injection period TiS for the subinjector 6b may be set to a value corresponding to the highest one of the predetermined absolute pressure values of the low rate supercharging region TiS map in FIG. 8 as well as the engine rpm Ne, that is, the constant predetermined value PB17 in the same map is applied in place of the actual value of the output signal PBNA from the low pressure range absolute pressure (PBNA) sensor 9'.

Further, in an engine which is free from the occurrence of the above-mentioned abnormalities such as premature ignition even with fuel supply to its sub combustion chamber during high rate supercharged operation, it is may be so arranged that such a value is read from the high rate supercharging region TiS map, as provides an ordinary or suitable quantity of fuel for the sub combustion chamber.

Reverting again to FIG. 6, if the answer to the question of the step 1 is negative or no, that is, the intake pipe absolute pressure is lower than the first predetermined value PBAMAX, the program proceeds to the steps 5 and 6, wherein the CPU 503 reads from the low rate supercharging region TiM map and the low rate supercharging region TiS map values of the basic fuel injection periods TiM and TiS for the main injectors 6a and the subinjector 6b, respectively, which correspond to the value of the output signal from the low pressure range absolute pressure (PBNA) sensor 9' and the value of the output signal Ne determined in terms of the time interval between adjacent pulses of the TD signal from the Ne sensor 12. As shown in FIG. 8, the low rate supercharging rate TiM map is provided with seventeen predetermined values PBA1–PBA17 of intake pipe absolute pressure ranging e.g. from 140 mmHg to 1160 mmHg, as well as sixteen predetermined values of engine rpm Ne ranging e.g. from 400 rpm to 6000 rpm. If either of values of the engine rpm Ne and the intake pipe absolute pressure Pb falls between adjacent ones of the respective predetermined values Ni or PBAi, the value of the fuel injection period TiM is determined by an interpolation method. On the other hand, the manner of determining the value of the fuel injection period TiS for the subinjector 6b by the use of the low supercharging region TiS map during low rate supercharged operation of the engine is similar to that described above with respect to the low rate supercharging region TiM map, description of which is therefore omitted.

Then, the values of the fuel injection periods TOUTM, TOUTS are calculated by the use of the equations (1) and (2) by correcting the values of the basic fuel injection periods TiM, TiS by the correction coefficients $K_1$, $TK_2$, $K'_1$ and $TK'_2$, at the step 7.

The method according to the invention may of course be applied to ordinary type internal combustion engines which are not equipped with the sub combustion chambers.

What is claimed is:

1. A method for electronically controlling the quantity of fuel being supplied to an internal combustion engine having an intake passage, a throttle valve arranged in said intake passage, and a supercharger, comprising the steps of: (1) detecting pressure in said intake passage of the engine at a location downstream of said throttle valve, by means of first and second pressure sensor means; (2) storing a plurality of predetermined values of basic fuel quantity which are functions of the intake passage pressure and the engine rpm, in each of first and second storage means which correspond, respectively, to said first and second pressure sensor means; (3) comparing the value of an output signal from one of said first and second pressure sensor means with a predetermined value; (4) reading from said first storage means a stored value of basic fuel quantity corresponding to the value of an output signal from said first pressure sensor means and the engine rpm, when it is determined in the step (3) that the value of the output signal from said one pressure sensor means is smaller than said predetermined value; and (5) reading from said second storage means a stored value of basic fuel quantity corresponding to the value of an output signal from said second pressure sensor means and the engine rpm, when it is determined in the step (3) that the value of the output signal from said one pressure sensor means is larger than said predetermined value; (6) and supplying a quantity of fuel corresponding to the stored value read in the step (4) or (5) to the engine.

2. A method as claimed in claim 1, wherein said predetermined values of basic fuel quantity stored in said first storage means are set at such values that the resulting air/fuel ratio of an air/fuel mixture supplied to the engine has a required value appropriate to operating conditions of the engine in a predetermined low rate supercharged operating region, whereas said predetermined values stored in said second storage means are set at such values that the resulting air/fuel ratio of an air/fuel mixture supplied to the engine has a value richer than said required value.

3. A method for electronically controlling the quantity of fuel being supplied to an internal combustion engine having an intake passage, a throttle valve arranged in said intake passage, a supercharger, at least one cylinder, a main combustion chamber provided in each of said at least one cylinder, and a sub combustion chamber provided in each of said at least one cylinder and communicating with said main combustion chamber, the method comprising the steps of: (1) detecting pressure in said intake passage at a location downstream of said throttle valve, by means of first and second pressure sensor means; (2) storing in each of first and second storage means two different sets of a plurality of predetermined values of basic fuel quantity being supplied, respectively, to said main combustion chamber and said sub combustion chamber, and which are functions of the intake passage pressure and the engine rpm; (3) comparing the value of an output signal from one of said first and second pressure sensor means with a predetermined value; (4) reading from said first storage means a stored value of basic fuel quantity in one of said two different sets, corresponding to the value of an output signal from said first pressure sensor means and the engine rpm and being supplied to the main combustion chamber, and also a stored value of basic fuel quantity in the other set, corresponding to the value of the output signal from said first pressure sensor means and the engine rpm and being supplied to the sub combustion chamber, when it is determined in the step (3) that the value of the output signal from said one pressure sensor means is smaller than said predetermined value; (5) reading from said second storage means a stored value of basic fuel quantity in one of said two different sets, corresponding to the value of an output signal from said second pressure sensor means and the engine rpm and being supplied to the main combustion chamber, and also a stored value of basic fuel quantity in the other set, corresponding to the value of the output signal from said second pressure sensor means and the engine rpm and being supplied to the sub combustion chamber, when it is determined in the step (3) that the value of the output signal from said one pressure sensor means is larger than said predetermined value; and (6) supplying quantities of fuel corresponding to respective ones of the stored values read in the step (4) or (5) to the main combustion chamber and the sub combustion chamber.

4. A method as claimed in claim 3, wherein said predetermined values of basic fuel quantity stored in said first storage means and being supplied to the main combustion chamber are set at such values that the resulting air/fuel ratio of an air/fuel mixture supplied to the engine has a required value appropriate to operating conditions of the engine in a predetermined low rate supercharged operating region, whereas said predetermined values stored in said second storage means and being supplied to the main combustion chamber are set at such values that the resulting air/fuel ratio of an air/fuel mixture supplied to the engine has a value richer than said required value.

5. A method as claimed in claim 3, wherein said step (5) includes reading from said second storage means stored values of basic fuel quantity being supplied to the sub combustion chamber, which have a common constant value, when the value of one variable of the intake passage pressure and the engine rpm remains constant while the value of the other variable is varying.

6. A method as claimed in claim 3, wherein said step (5) includes reading from said second storage means a predetermined fixed value of basic fuel quantity stored therein and being supplied to the sub combustion chamber, irrespective of the values of the intake passage pressure and the engine rpm.

7. A method as claimed in claim 6, wherein said predetermined fixed value of basic fuel quantity stored in second storage means is set at a value of zero.

* * * * *